United States Patent
Fergason

(10) Patent No.: US 9,847,073 B2
(45) Date of Patent: Dec. 19, 2017

(54) APPARATUS AND METHOD FOR PREPARING, STORING, TRANSMITTING AND DISPLAYING IMAGES

(75) Inventor: James L. Fergason, Menlo Park, CA (US)

(73) Assignee: Fergason Licensing LLC, Portola Valley, CA (US)

( * ) Notice: Subject to any disclaimer, the term of this patent is extended or adjusted under 35 U.S.C. 154(b) by 791 days.

(21) Appl. No.: 13/618,370

(22) Filed: Sep. 14, 2012

(65) Prior Publication Data

US 2013/0069998 A1    Mar. 21, 2013
US 2017/0309250 A9    Oct. 26, 2017

Related U.S. Application Data

(63) Continuation of application No. 13/571,420, filed on Aug. 10, 2012, which is a continuation of application (Continued)

(51) Int. Cl.
*G09G 5/10* (2006.01)
*G09G 3/34* (2006.01)
(Continued)

(52) U.S. Cl.
CPC ............ *G09G 5/10* (2013.01); *G09G 3/3406* (2013.01); *H04N 5/232* (2013.01); *H04N 5/76* (2013.01);
(Continued)

(58) Field of Classification Search
CPC ... G09G 2320/0646; G09G 2320/0673; G09G 2370/04; G09G 3/3406; G09G 5/003;
(Continued)

(56) References Cited

U.S. PATENT DOCUMENTS 2,885,551 A    5/1959   Greanias
3,329,474 A    7/1967   Harris et al.
(Continued)

FOREIGN PATENT DOCUMENTS

EP    0 606 162    7/1994
EP    0 730 371    9/1996
(Continued)

OTHER PUBLICATIONS

A. Yasuda et al.; "A Practical Wobbling Device Using Ferroelectric Liquid Crystals for Realizing High Resolution Projectors"; Asia Display '95; Oct. 1995; pp. 79-81.

*Primary Examiner* — Dmitriy Bolotin
(74) *Attorney, Agent, or Firm* — Meunier Carlin & Curfman LLC

(57) ABSTRACT

An imaging and display apparatus for passive displays evaluates the illumination of an input scene and incorporates data representative of such input scene within a transfer media. The transfer media may be a storage medium storing image data, illumination data and gamma information for delivery to a passive display system. The data controls the optical characteristics of the illumination source for the passive display and the gamma and tends to minimize energy requirements, to maximize contrast or shades of gray in the displayed image, and to optimize light source operation for color fidelity. The data provided the media and/or display as a video signal, modulated video signal, s-video signal, digital signal, or other signal that can be used by a passive display system to display images.

15 Claims, 5 Drawing Sheets

Related U.S. Application Data

No. 10/796,259, filed on Mar. 9, 2004, now Pat. No. 8,243,004.

(60) Provisional application No. 60/453,147, filed on Mar. 10, 2003.

(51) Int. Cl.
- *H04N 5/232* (2006.01)
- *H04N 5/76* (2006.01)
- *G09G 5/00* (2006.01)
- *H04N 5/77* (2006.01)
- *H04N 9/82* (2006.01)

(52) U.S. Cl.
CPC ..... *G09G 5/003* (2013.01); *G09G 2320/0646* (2013.01); *G09G 2320/0673* (2013.01); *G09G 2370/04* (2013.01); *H04N 5/772* (2013.01); *H04N 9/8205* (2013.01)

(58) Field of Classification Search
CPC G09G 5/10; H04N 5/232; H04N 5/76; H04N 5/772; H04N 9/8205
USPC .............. 345/87–102, 204–214, 690–699
See application file for complete search history.

(56) References Cited

U.S. PATENT DOCUMENTS

| | | | |
|---|---|---|---|
| 3,375,052 A | 3/1968 | Kosanke et al. | |
| 3,428,743 A | 2/1969 | Hanlon | |
| 3,439,348 A | 4/1969 | Harris et al. | |
| 3,499,700 A | 3/1970 | Harris et al. | |
| 3,503,670 A | 3/1970 | Kosanke et al. | |
| 3,554,632 A | 1/1971 | Chitayat | |
| 3,854,793 A | 12/1974 | Kahn | |
| 4,012,116 A | 3/1977 | Yevick | |
| 4,090,219 A | 5/1978 | Ernstoff et al. | |
| 4,097,128 A | 6/1978 | Matsumoto et al. | |
| 4,110,794 A | 8/1978 | Lester et al. | |
| 4,114,990 A | 9/1978 | Mash et al. | |
| 4,385,806 A | 5/1983 | Fergason | |
| 4,410,238 A | 10/1983 | Hanson | |
| 4,436,376 A | 3/1984 | Fergason | |
| 4,468,703 A | 8/1984 | Fujiwara et al. | |
| 4,516,837 A | 5/1985 | Soref et al. | |
| 4,540,243 A | 9/1985 | Fergason | |
| 4,582,396 A | 4/1986 | Bos et al. | |
| 4,611,889 A | 9/1986 | Buzak | |
| 4,648,691 A | 3/1987 | Oguchi et al. | |
| 4,649,425 A | 3/1987 | Pund | |
| RE32,521 E | 10/1987 | Fergason | |
| 4,719,507 A | 1/1988 | Bos | |
| 4,755,038 A | 7/1988 | Baker | |
| 4,760,389 A | 7/1988 | Aoki et al. | |
| 4,834,500 A | 5/1989 | Hilsum et al. | |
| 4,910,413 A | 3/1990 | Tamune | |
| 4,917,452 A | 4/1990 | Liebowitz | |
| 4,923,286 A | 5/1990 | Grupp | |
| 4,958,915 A | 9/1990 | Okada et al. | |
| 4,969,717 A | 11/1990 | Mallinson | |
| 4,991,924 A | 2/1991 | Shankar et al. | |
| 4,997,263 A | 3/1991 | Cohen et al. | |
| 5,012,274 A | 4/1991 | Dolgoff | |
| 5,013,140 A | 5/1991 | Healey et al. | |
| 5,074,647 A | 12/1991 | Fergason et al. | |
| 5,083,199 A | 1/1992 | Borner | |
| 5,093,652 A | 3/1992 | Bull et al. | |
| 5,122,791 A | 6/1992 | Gibbons et al. | |
| 5,128,782 A | 7/1992 | Wood | |
| 5,138,449 A | 8/1992 | Kerpchar | |
| 5,143,433 A | 9/1992 | Farrell | |
| 5,144,292 A * | 9/1992 | Shiraishi et al. | 345/102 |
| 5,146,496 A | 9/1992 | Westerfer et al. | |
| 5,162,785 A | 11/1992 | Fagard | |
| 5,164,829 A | 11/1992 | Wada | |
| 5,187,603 A | 2/1993 | Bos | |
| 5,192,946 A * | 3/1993 | Thompson et al. | 348/764 |
| 5,206,629 A * | 4/1993 | DeMond et al. | 345/206 |
| 5,206,633 A | 4/1993 | Zalph | |
| 5,221,982 A | 6/1993 | Faris | |
| 5,295,009 A | 3/1994 | Barnik et al. | |
| 5,300,942 A | 4/1994 | Dolgoff | |
| 5,305,146 A | 4/1994 | Nakagaki et al. | |
| 5,311,217 A | 5/1994 | Guerin et al. | |
| 5,313,225 A | 5/1994 | Miyadera | |
| 5,315,695 A | 5/1994 | Saito et al. | |
| 5,317,400 A | 5/1994 | Gurley et al. | |
| 5,319,478 A | 6/1994 | Funfschilling et al. | |
| 5,325,218 A | 6/1994 | Willett et al. | |
| 5,357,369 A | 10/1994 | Pilling et al. | |
| 5,359,345 A | 10/1994 | Hunter | |
| 5,369,266 A | 11/1994 | Nohda et al. | |
| 5,379,069 A * | 1/1995 | Tani | 348/333.11 |
| 5,398,038 A | 3/1995 | Hoashi | |
| 5,416,496 A | 5/1995 | Wood | |
| 5,420,635 A * | 5/1995 | Konishi et al. | 348/362 |
| 5,422,680 A | 6/1995 | Lagoni et al. | |
| 5,436,755 A | 7/1995 | Guerin | |
| 5,485,172 A | 1/1996 | Sawachika et al. | |
| 5,519,524 A | 5/1996 | Fergason et al. | |
| 5,532,854 A * | 7/1996 | Fergason | 349/200 |
| 5,537,256 A | 7/1996 | Fergason | |
| 5,572,341 A | 11/1996 | Fergason | |
| 5,606,458 A | 2/1997 | Fergason | |
| 5,617,112 A | 4/1997 | Yoshida et al. | |
| 5,621,572 A | 4/1997 | Fergason | |
| 5,627,603 A * | 5/1997 | Sakai | 348/708 |
| 5,689,283 A | 11/1997 | Shirochi | |
| 5,715,029 A | 2/1998 | Fergason | |
| 5,717,422 A * | 2/1998 | Fergason | 345/102 |
| 5,764,287 A | 6/1998 | Tatsumi | |
| 5,818,529 A * | 10/1998 | Asamura et al. | 375/240.23 |
| 5,850,487 A * | 12/1998 | Takane et al. | 382/298 |
| 5,858,589 A | 1/1999 | Govaert et al. | |
| 5,907,358 A | 5/1999 | Tatsumi | |
| 5,976,017 A * | 11/1999 | Omori et al. | 463/32 |
| 6,111,559 A | 8/2000 | Motomura et al. | |
| 6,184,969 B1 * | 2/2001 | Fergason | 349/196 |
| 6,233,389 B1 | 5/2001 | Barton et al. | |
| 6,268,843 B1 | 7/2001 | Arakawa | |
| 6,434,274 B1 * | 8/2002 | Horie et al. | 382/274 |
| 6,448,944 B2 | 9/2002 | Ronzani et al. | |
| 6,519,410 B1 | 2/2003 | Okada et al. | |
| 6,519,722 B1 | 2/2003 | Wiggins | |
| 6,519,772 B1 | 2/2003 | Bopardikar | |
| 6,563,946 B2 * | 5/2003 | Kato | 382/166 |
| 6,639,626 B1 * | 10/2003 | Kubo et al. | 348/218.1 |
| 6,693,612 B1 * | 2/2004 | Arakawa et al. | 345/87 |
| 6,714,337 B1 | 3/2004 | Amm | |
| 6,774,952 B1 * | 8/2004 | Ratcliffe | 348/581 |
| 6,795,053 B1 * | 9/2004 | Funamoto et al. | 345/102 |
| 6,816,141 B1 * | 11/2004 | Fergason | 345/88 |
| 6,822,628 B2 | 11/2004 | Dunphy et al. | |
| 6,891,672 B2 * | 5/2005 | Whitehead et al. | 359/443 |
| 6,947,025 B2 * | 9/2005 | Iisaka et al. | 345/108 |
| 7,002,623 B1 | 2/2006 | Ohyama et al. | |
| 7,015,902 B2 * | 3/2006 | Nagai et al. | 345/204 |
| 7,027,016 B2 * | 4/2006 | Sakashita | 345/84 |
| 7,136,528 B2 | 11/2006 | Edwards et al. | |
| 7,236,526 B1 * | 6/2007 | Kitamura | 375/240.16 |
| 7,352,347 B2 | 4/2008 | Fergason | |
| 7,450,104 B2 * | 11/2008 | Baik | 345/102 |
| 7,522,135 B2 * | 4/2009 | Baik | 345/88 |
| 7,639,220 B2 * | 12/2009 | Yoshida et al. | 345/87 |
| 7,683,857 B2 * | 3/2010 | Yoshida | 345/32 |
| 7,688,294 B2 * | 3/2010 | Baik | 345/88 |
| 8,243,004 B2 | 8/2012 | Fergason | |
| 8,514,166 B2 * | 8/2013 | Chen et al. | 345/102 |
| 8,687,271 B2 * | 4/2014 | Ninan | 359/443 |
| 2002/0003522 A1 * | 1/2002 | Baba et al. | 345/89 |
| 2002/0122020 A1 | 9/2002 | Moon et al. | |
| 2002/0171617 A1 * | 11/2002 | Fuller | 345/102 |
| 2002/0180719 A1 * | 12/2002 | Nagai et al. | 345/206 |

(56) References Cited

U.S. PATENT DOCUMENTS

| | | | |
|---|---|---|---|
| 2003/0043165 A1* | 3/2003 | Miyachi et al. | 345/589 |
| 2003/0071907 A1* | 4/2003 | Karasaki et al. | 348/333.01 |
| 2003/0090455 A1* | 5/2003 | Daly | 345/102 |
| 2003/0231347 A1* | 12/2003 | Imai | 358/2.1 |
| 2004/0012551 A1 | 1/2004 | Ishii | |
| 2004/0012556 A1* | 1/2004 | Yong et al. | 345/102 |
| 2004/0113906 A1* | 6/2004 | Lew et al. | 345/211 |
| 2011/0122272 A1* | 5/2011 | Fergason | 348/222.1 |

FOREIGN PATENT DOCUMENTS

| | | |
|---|---|---|
| FR | 2 611 389 | 9/1988 |
| GB | 2 033 602 | 5/1980 |
| JP | 55-73023 | 6/1980 |
| JP | 56-114931 | 9/1981 |
| JP | 58-142315 | 8/1983 |
| JP | 60-083486 | 5/1985 |
| JP | 1985-125891 | 7/1985 |
| JP | 62-47623 | 3/1987 |
| JP | 62-231221 | 10/1987 |
| JP | 63-13018 | 1/1988 |
| JP | 01-098383 | 4/1989 |
| JP | 03-009320 | 1/1991 |
| JP | 03-071111 | 3/1991 |
| JP | 1991-179886 | 8/1991 |
| JP | 03-249730 | 11/1991 |
| JP | 03-288885 | 12/1991 |
| JP | 1991-125333 | 12/1991 |
| JP | 04-113308 | 4/1992 |
| JP | 50-066501 | 3/1993 |
| JP | 05-080717 | 4/1993 |
| JP | 05-127608 | 5/1993 |
| JP | 05-188345 | 7/1993 |
| JP | 05-241525 | 9/1993 |
| JP | 05-289044 | 11/1993 |
| JP | 06-082846 | 3/1994 |
| JP | 06-102484 | 4/1994 |
| JP | 06-160811 | 6/1994 |
| JP | 06-161383 | 6/1994 |
| JP | 07-129113 | 5/1995 |
| WO | WO 93/15467 | 8/1993 |
| WO | WO 94/10675 | 5/1994 |

* cited by examiner

APPARATUS AND METHOD FOR PREPARING, STORING, TRANSMITTING AND DISPLAYING IMAGES

CROSS-REFERENCE TO RELATED APPLICATION

This application claims priority of U.S. Provisional Patent Application Ser. No. 60/453,147, filed Mar. 10, 2003, which is incorporated by reference.

TECHNICAL FIELD

The present invention relates generally to apparatus and method for use in the field of display, and, more particularly, to apparatus and method in which illumination information and/or other information may be obtained and stored or transmitted in addition to image data. The invention also relates to apparatus and method for one or more of preparing, storing, transmitting and displaying images.

BACKGROUND

In the course of preparing images for display, such as, for example, movies, whether of the amateur or home type or professional type, videos, and the like, a camera typically would record one or more images of one or more scenes. The image information pertaining to the respective scene(s) may be processed and provided as image data. Processing may include, for example, arranging the data in a particular format for recording or for broadcasting. Various formats in which such data is stored and broadcast are known and new formats may be developed in the future. The image information and, thus, the image data may include, for example, respective R, G, B values, Y, U, V values, intensity, hue, saturation, and/or other information that may be used in displaying the image on a television, monitor or some other display. An example of a signal carrying such information is a video signal; another example is a digital signal. The present invention is not limited to the particular signal type or to the format of such signals.

One example of a format for image data storage is that in which the data representing the image characteristics of a frame, such as a momentary image of a scene, whether a "real" scene or an animated scene, may be stored in a storage medium, such as a DVD, CD, tape, computer hard drive, or some other memory; a number of sequential frames provide for a sequence of displayed images to display a motion picture, video, etc. One approach for storing image date for television display uses two fields to compose a frame, the image data for respective fields being stored in odd or even lines corresponding to the horizontal scan lines of a conventional television CRT (cathode ray tube) type of display. The present invention, as is described in detail below, is concerned with image data and is not limited to the format in which that image data is stored, such as, the number of fields from one to any larger number of fields per frame.

In the course of filming scenes, by using video camera, digital camera, film camera, or any other means to obtain images, illumination level ordinarily is determined by the amount of light incident on, reflected from or produced by objects in the scene or otherwise directed for pickup by the camera. The brightness characteristics of image information from a given scene as recorded by a camera may be adjusted by adjusting the camera aperture and/or shutter speed. Also, an optical filter may be used to change the appearance of a scene to a camera and, thus, characteristics of the image information obtained or recorded by the camera. However, there are a number of limitations on such filming techniques. For example, it may be rather inconvenient and time consuming to change optical filters during the course of filming a scene. Also, as illumination levels change, the effective sensitivity of the camera may be changed, whereby the amount of data perceived accurately by the camera may be diminished, e.g., loss of resolution, contrast, etc. Thus, there is a need to improve such resolution and contrast.

There are a number of different types of displays able to display images, such as movies, videos, still images, and the like. One type of display is a passive display. A passive display usually operates by modulating light that is provided thereto (incident light). An example of a passive display is a liquid crystal display, and another example of a passive display is known as a digital micro mirror device (DMD), such as that sold by Texas Instruments Incorporated. There are a number of liquid crystal display devices, such as, for example, those known as twisted nematic, supertwist, polymer disbursed liquid crystal (PDLC) also known as encap (NCAP), and ferroelectric; these are examples, and others may exist now or in the future. Another type of display is an active or light emitting display, which provides light output without the need for a separate illumination source or light source; examples include cathode ray tubes (CRT), electroluminescent displays (EL), plasma displays, and others that may exist now or in the future.

The displaying of a dark scene using a passive display encounters a disadvantage that ordinarily is not present for active displays. The problem has to do with reduced resolution and/or contrast of the displayed dark image. In an active display, such as a CRT, for example, when it is desired to display a dark scene, the intensity of the output light can be reduced by reducing input to individual pixels. The parts of the dark scene may be output at the reduced brightness or illumination level. However, the number of light producing pixels does not have to be reduced; all pixels of the CRT can be active so that resolution is maintained even though intensity of the light produced by the pixel phosphors, for example, may be reduced. A pixel sometimes is referred to as a picture element or pel, a phosphor dot in a monochrome display, especially a CRT type, or a group of three (red, green and blue) phosphor dots for a multicolor display, etc.

However, in a passive display, such as a liquid crystal display, a prior approach to reduce brightness of a displayed image or scene has been to reduce the number of pixels which are reflecting or transmitting light at a particular moment to form a relatively dark image. Such a reduction reduces the resolution and/or contrast of the display. Such a reduction also may adversely affect gamma characteristic of the display and/or of particular images provided by the display.

The pixels may be discrete pixels or may be blocks or areas where an optical signal or optical output can be developed by emission of an active display or by reflection or transmission of a passive display. The optical signal referred to may mean that light is "on" or provided as an output from the device or that the pixel has its other condition for not producing or providing a light output, e.g., "off"; and the optical signal also may be various brightnesses of light or shades of gray. The optical output or optical signal produced by a pixel may be a color or light of a particular color. These and other operating characteristics of displays are known and quite standard in the field of display technology.

The human eye has difficulty distinguishing between seeing or recognizing the difference between low and high brightness and contrast ranges. This difficulty is increased when the number of pixels is decreased and resolution is degraded. An approach to improve resolution and contrast in a passive display is described in U.S. Pat. No. 5,717,422, which is incorporated in its entirety by this reference. Other pending patent applications that describe approaches to increase resolution and contrast for a passive display, even when the display is showing a relatively dark image, are described in U.S. Pat. No. 6,184,969, issued Feb. 6, 2001, and co-pending U.S. patent application Ser. No. 09/676,915, filed Oct. 2, 2000, the entire disclosures of which are incorporated by this reference. The patents and patent application just mentioned describe controlling the intensity of light supplied to a light modulating passive display as a function of a brightness characteristic of the image being displayed.

In the '422 patent is disclosed a passive display apparatus, such as an LCD, and method for displaying images with high contrast by controlling the light input to the display to control brightness of the output image while operating respective pixels of the display to obtain good resolution and contrast without regard to the output brightness. Different color effects also can be obtained. As is described in the '422 patent, an image of a candle lit room would be relatively dim. The prior art passive displays would use a relatively small number of pixels to provide light that creates the image, whereas a relatively large number of pixels would be used to block light to give the effect of reduced intensity or dim room. In the invention of '422 patent, though, the number of pixels used to create the imagery does not have to be reduced to reduce light intensity or brightness of the image; rather, the intensity of the illuminating or incident light changes to diminish the brightness of the image. Therefore, image data would not be lost as brightness of an image is decreased. Thus, the amount of information that can be conveyed by the display in creating the image is increased over the capabilities in the prior art.

As an example of increased information provided by the invention of the '422 patent, one could obtain a gray scale of 100 shades of gray by using a passive display that provides 10 shades of gray and an illuminating source that provides light at 10 different levels; multiplying the display capability times the illuminating source capability yields 100 shades of gray. Gray scale capability can be increased further using a field sequential color display in which the illuminating light is provided sequentially as red, green, and blue light, each of which can be modulated separately by the display. Wide range of gray scale is advantageous in head mounted displays, e.g., virtual reality displays or other head mounted displays, where immersion in the image is desirable. Using features of the '422 patent, as were just described, high illumination can be provided a scene as it is filmed, yet the gray scale and contrast ratio of the image as actually displayed can be adjusted by adjusting the illuminating source for the display without loss of image data or with minimal loss of image data. Thus, a high contrast image can be presented. Also, adjustments can be made selectively to alter images so that, for example, a sunrise scene can be provided in which red portions of the image are enhanced and blue and green are minimized.

By separating the two functions of brightness (according to the intensity of the illuminating source) and image (based on operation of a passive display, e.g., a liquid crystal modulator), images can be adjusted to achieve a desired result. An example is to photograph a scene in daylight to get good resolution and contrast, and then by adjusting the illuminating source and/or the colors of the illuminating source, the impression of a moonlit scene, a candle lit environment, sunrise or sunset, etc., can be obtained.

Gamma is a characteristic or parameter that is used in the field of display technology. The Adobe Photoshop Version 7.0 software describes gamma in relation to the brightness of midtone values. As described there, the midtone values from black to white as produced by a monitor are nonlinear and, therefore, would be represented graphically as a curve rather than as a straight line. The slope of the curve halfway between black and white is what is defined by that software as the gamma value. Such software provides the possibility of adjusting gamma to improve the accuracy of a displayed image in reproducing the actual colors of a scene that is represented by the image. According to another consistent definition, gamma is the transfer function from the input light to the output image.

Gamma correction in the field of computer graphics also concerns control of overall brightness of an image. Gamma correction is desirable to obtain accurate displaying of images on a computer display or other display, display system, monitor or television. Note that the terms display, monitor, television and the like are used synonymously herein unless otherwise expressed or indicated by context. Varying the amount of gamma correction that is applied in a given display system may change brightness and also the ratios of red, green and blue colors, for example, that are displayed. Gamma correction is provided in conventional display systems in various ways to take into account that the intensity of a given pixel may have a non-linear relation to the drive signal, e.g., the drive voltage, for that pixel. As one example, for a conventional cathode ray tube monitor, the intensity to voltage response curve may be on the order of a 2.5 power function. Therefore, if for a given pixel an intensity voltage representing an intensity of i were to be delivered to the monitor, the monitor actually would provide intensity of $i^{2.5}$ (i to the 2.5 power). Therefore, the actual voltage supplied to the monitor must be corrected, i.e., gamma corrected, so the proper intensity is displayed. As is evident, gamma correction can be relatively complicated and in many instances the user of a display is not provided the ability manually to adjust gamma.

Color fidelity is the extent of accurate representation of the color characteristics of a scene as portrayed by a displayed image. Color fidelity may be degraded due to inaccurate illumination and/or gamma of a displayed image compared to the original scene. It would be desirable to improve color fidelity for passive displays and display systems.

It would be desirable to improve one or more of the contrast and resolution of and accuracy of image portrayal by passive displays. It also would be desirable to improve correction of gamma for passive displays. It also would be desirable to facilitate such improvements, adjustments and corrections.

A media processor is a device that is used in connection with televisions, computer displays, liquid crystal displays, and other displays to receive input signals representing image and/or other information and to provide an output in a format that can be displayed. Sometimes such a media processor is referred to as a media processor integrated circuit because the circuit and software functions thereof can be included in a single integrated circuit (or may be in several integrated circuits). It would be desirable to include in conjunction with a media processor integrated circuit one or more of the other features described herein.

SUMMARY

An aspect of the invention relates to a system synchronized brightness control for video images and/or other images that are displayed sequentially using a passive display, including obtaining a characteristic brightness profile for one or more frames or images in a sequence of images and adjusting the illumination intensity (sometimes referred to as brightness) and/or gamma.

Another aspect of the invention relates to a system synchronized brightness control for video images and/or other images that are displayed sequentially using a passive display, including a circuit and/or computer software to obtain a characteristic brightness profile for one or more frames or images in a sequence of images and an adjustment for the illumination intensity (sometimes referred to as brightness) and/or gamma.

Another aspect relates to using a media processor integrated circuit or the like capable of receiving different respective input signals and based thereon providing output signals to operate respective displays, such as, for example, television, HDTV, liquid crystal display, computer display, and/or other display(s) to provide images.

An aspect of the invention relates to a method for displaying an image, including receiving image data representative of respective images, receiving brightness data representative of the brightness of respective images, based on the image data, modulating light from a light source to provide respective images (for viewing/for projecting), based on brightness data, adjusting light from the light source to affect brightness of the image.

Another aspect relates to a storage medium, including a material able to retain data representative of images, image data stored in the material, said image data representative of respective images, brightness data stored in the material, said brightness data representative of brightness of respective images, and wherein the storage locations at which the brightness data is stored is different from the storage locations at which the image data is stored.

Another aspect relates to a method of data storage for a sequence of images, including storing in a storage medium image data representative of a sequence of images, storing at a different location in the storage medium brightness data representative of brightness of respective images.

Another aspect relates to a method of storing image data, including storing in a storage medium image information representing respective images, and storing image brightness information in the storage medium at a separate location from the location at which image information is stored.

Another aspect relates to a system for displaying images and information using passive displays as set forth in other claims and summaries hereof, wherein the passive display is a liquid crystal display.

Another aspect relates to a display system for passive displays, wherein data representing illumination characteristics of an input image or scene has been incorporated in a transfer media (e.g., air, modulated video signals, radio signals, cable transmission, storage medium (e.g., dvd, cd, tape, computer)), including a control responsive to such data to control the optical characteristics of incident light to a passive display to tend to optimize (maximize) contrast or shades of gray in the displayed image.

Another aspect relates to a display system for passive displays, wherein data representing illumination characteristics of an input image or scene has been incorporated in a transfer media (e.g., air, modulated video signals, radio signals, cable transmission, storage medium (e.g., dvd, cd, tape, computer)), including a control responsive to such data to control the optical characteristics of incident light to a passive display to tend to optimize or to maximize color fidelity.

Another aspect relates to a system for preparing data for use in displaying a sequence of images, including an input to receive image information for use in operating a light modulating display to provide a sequence of images, an analyzer to analyze illumination characteristics of a number of images of such a sequence of images to obtain light control information for use in controlling optical characteristics of the incident light to a light modulating display and gamma so as to tend at least one of to minimize energy usage, to maximize contrast or shades of gray, and to maximize color fidelity of displayed images.

Another aspect relates to a display system, including a passive display, a source of illumination to illuminate the passive display and cooperative with the passive display to present images, and a transfer medium providing data to control optical characteristics of light from the source of illumination and gamma at least one of to minimize energy and to maximize contrast (e.g., shades of gray) in respective displayed images by the passive display, and wherein the data is based on an evaluation of illumination of an input scene represented by an image for display.

Another aspect relates to a display system for displaying a sequence of images, including a passive display, a light source to provide light to illuminate the passive display, drive circuitry to drive the passive display to modulate light from the light source to provide images, and a transfer medium providing image data representing respective images of an input scene and illumination data representative of an evaluation of the illumination of an input scene to control optical characteristics of the light source.

Another aspect pertains to for use with a passive display operable to be illuminated by light from a light source to provide images, a transfer medium providing image data representing respective images of an input scene and illumination data representative of an evaluation of the illumination of an input scene to control optical characteristics of such a light source.

Another aspect pertains to for use with a passive display operable to be illuminated by light from a light source to provide images, a transfer medium providing image data representing respective images of an input scene and gamma data representative of an evaluation of the illumination and/or colors of an input scene to control optical characteristics of such a light source.

Another aspect relates to a system for providing image data for display by an illuminated passive display, including an image obtaining device to provide image data representing input scenes, apparatus (e.g., integrator, averager, weighted averager, standard deviation) to evaluate the illumination of input scenes to provide illumination data to control the optical characteristics of an illumination source for a passive display.

Another aspect relates to a method of editing images, which are composed of an assemblage of pixels (pels, picture elements) for display or projection using a passive display to which input light is incident to provide images (e.g., for display or projection), including adjusting a characteristic of the input light to obtain a desired appearance of the displayed image, and storing the adjusted characteristic for use subsequently to adjust the characteristic of input light to obtain a desired appearance of the image provided by a passive display.

Another aspect relates to a method of reducing the amount of data required to provide images from a source to a receiver for display or projection via a passive display and light source, including separating intensity data from image data representing an image for display to obtain reduced image data and intensity data, separately providing to the display and to the light source or light control for the display, respectively, the image data excluding the intensity data for respective images and the intensity data.

Another aspect relates to a method for synchronized brightness control of video images and/or other images that are displayed sequentially using a passive display, comprising obtaining a characteristic brightness profile for one or more frames or images in a sequence of images, and adjusting at least one of the illumination intensity and/or gamma.

Another aspect relates to a system synchronized brightness control for video images and/or other images that are displayed sequentially using a passive display, including a circuit and/or computer software to obtain a characteristic brightness profile for one or more frames or images in a sequence of images and an adjustment for at least one of the illumination intensity and/or gamma.

Another aspect relates to a method of using a media processor integrated circuit or the like capable of receiving different respective input signals and based thereon providing output signals to operate respective displays, such as, for example, television, HDTV, liquid crystal display, computer display, and/or other display(s) to provide images, comprising receiving input data representing image information and brightness information, and providing such information respectively for displaying images and for determining illumination intensity.

Another aspect relates to a method of using a media processor integrated circuit or the like, including receiving input video signals or the like representing images and brightness of the images, determining brightness of respective images, and providing a control to control a source of illumination for a display to display such images at controlled brightness.

Another aspect relates to obtaining image information pertaining to one or more scenes, separating image data and illumination data representing the image information, and providing the image data and illumination data to a medium for use in displaying an image using a passive display.

Another aspect of the invention relates to a device that obtains image information pertaining to one or more scenes, apparatus to separate image data and illumination data representing the image information, and a medium to which the image data and illumination data are provided for use in displaying an image using a passive display.

An aspect of the invention relates to obtaining image information pertaining to one or more scenes, separating gamma information pertaining to the image information and providing image data representative of the image information and the gamma data to a medium for use in displaying an image using a passive display.

An aspect of the invention relates to a device that obtains image information pertaining to one or more scenes, apparatus that separates gamma information pertaining to the image information and a medium to which image data representative of the image information and the gamma data is provided for use in displaying an image using a passive display.

An aspect of the invention relates to a method for displaying an image, including receiving image data representative of respective images, receiving brightness or illumination level data (as used throughout this patent application brightness and illumination may be interchangeable unless otherwise indicated by context) representative of the brightness of respective images, based on the image data, modulating light from a light source to provide respective images for viewing or for projecting, based on brightness or illumination level data, adjusting light from the light source to affect brightness of the image.

An aspect of the invention relates to a storage medium, including a material able to retain data representative of images, image data stored in the material, said image data representative of respective images, brightness data stored in the material, said brightness data representative of brightness of respective images, and wherein the storage locations at which the brightness data is stored is different from the storage locations at which the image data is stored.

An aspect of the invention relates to a method of data storage for a sequence of images, including storing in a storage medium image data representative of a sequence of images, storing at a different location in the storage medium brightness data representative of brightness of respective images.

An aspect of the invention relates to a method of storing image data, including storing in a storage medium image information representing respective images, and storing image brightness information in the storage medium at a separate location from the location at which image information is stored.

According to an aspect, a display system for passive displays, wherein data representing illumination characteristics of an input image or scene has been incorporated in a transfer media (e.g., air, modulated video signals, radio signals, cable transmission, storage medium (e.g., dvd, cd, tape, computer)), and a control responsive to such data to control the optical characteristics of incident light to a passive display to tend to minimize energy usage by a source of such incident light.

An aspect of the invention relates to a display system for passive displays, wherein data representing illumination characteristics of an input image or scene has been incorporated in a transfer media (e.g., air, modulated video signals, radio signals, cable transmission, storage medium (e.g., dvd, cd, tape, computer)), and a control responsive to such data to control the optical characteristics of incident light to a passive display to tend to optimize (maximize) contrast or shades of gray in the displayed image.

An aspect of the invention relates to a display system for passive displays, wherein data representing illumination characteristics of an input image or scene has been incorporated in a transfer media, e.g., air, modulated video signals, radio signals, cable transmission, storage medium, dvd, cd, tape, computer, and a control responsive to such data to control the optical characteristics of incident light to a passive display to tend to optimize or to maximize color fidelity.

An aspect of the invention relates to a system for preparing data for use in displaying a sequence of images, including an input to receive image information for use in operating a light modulating display to provide a sequence of images, and an analyzer to analyze illumination characteristics of a number of images of such a sequence of images to obtain light control information for use in controlling optical characteristics of the incident light to a light modulating display and gamma so as to tend at least one of to minimize energy usage, to maximize contrast or shades of gray, and to maximize color fidelity of displayed images.

An aspect of the invention relates to a display system, including a passive display, a source of illumination to illuminate the passive display and cooperative with the passive display to present images, and a transfer medium providing data to control optical characteristics of light from the source of illumination and gamma at least one of to minimize energy and to maximize contrast (e.g., shades of gray) in respective displayed images by the passive display, and wherein the data is based on an evaluation of illumination of an input scene represented by an image for display.

An aspect of the invention relates to a display system for displaying a sequence of images, including a passive display, a light source to provide light to illuminate the passive display, drive circuitry to drive the passive display to modulate light from the light source to provide images, and a transfer medium providing image data representing respective images of an input scene and illumination data representative of an evaluation of the illumination of an input scene to control optical characteristics of the light source.

An aspect of the invention relates to for use with a passive display operable to be illuminated by light from a light source to provide images, a transfer medium providing image data representing respective images of an input scene and illumination data representative of an evaluation of the illumination of an input scene to control optical characteristics of such a light source.

An aspect of the invention relates to a system for providing image data for display by an illuminated passive display, including an image obtaining device to provide image data representing input scenes, apparatus (e.g., integrator, averager, weighted averager, standard deviation) to evaluate the illumination of input scenes to provide illumination data to control the optical characteristics of an illumination source for a passive display.

An aspect of the invention relates to a method of editing images, which are composed of an assemblage of pixels (pels, picture elements) for display or projection using a passive display to which input light is incident to provide images (for display, as used herein the verb of to display, displaying or the like means displaying for direct view, including, but not limited to viewing directly of a display, viewing the display through one or more lenses, reflectors, filters, etc., or displaying for projection), including adjusting a characteristic of the input light to obtain a desired appearance of the displayed image, and storing the adjusted characteristic for use subsequently to adjust the characteristic of input light to obtain a desired appearance of the image provided by a passive display.

An aspect of the invention relates to a method of reducing the amount of data required to provide images from a source to a receiver for display (or projection) via a passive display and light source, including separating intensity data from image data representing an image for display to obtain reduced image data and intensity data, separately providing (a) the image data excluding the intensity data and (b) the intensity data to control the passive display and the light source, respectively.

An aspect relates to system including a storage media and an image data file and illumination data that is in addition to the image data file, the image data file and the illumination data being stored in the storage media.

An aspect relates to method of editing or adjusting data representing images of a scene, whether actual or animated, and wherein the data is for use in a display to portray the scene, comprising adjusting or correcting gamma of a number of images represented by the data.

An aspect relates to apparatus for editing information representative of sequential images representative of a scene, whether an actual scene or an animated scene, comprising an editor, manual or automatic, to provide adjustment of gamma to a number of the sequential images, wherein the adjustments may be different for different respective images.

The present invention can be used in display systems that use displays that are directly viewed, those in which there is reflection of light from the displays to provide for viewing of them, those in which light is projected, e.g., via a lens system or the like, and in virtually any other type of display system in which a passive display may be used.

Several embodiments and features of the invention are illustrated and described herein. It will be appreciated that the parts, functions, features, etc. of any embodiment may be used in or in combination with another embodiment.

To the accomplishment of the foregoing and related ends, the invention comprises the features hereinafter fully described and particularly pointed out in the claims. The following description and the annexed drawings set forth in detail certain illustrative embodiments of the invention. These embodiments, however, are merely indicative of a few of the various ways in which the principles of the invention may be employed. Other objects, advantages and novel features of the invention will become apparent from the following detailed description of the invention when considered in conjunction with the drawings.

Although the invention is shown and described with respect to one or more embodiments, it is obvious that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

In the annexed drawings:

FIGS. 3A and 3B illustrate exemplary data arrangements and storage approaches according to an embodiment of the invention, wherein FIG. 3A represents an exemplary frame and the multiplexing of image data with illumination data and gamma data, and FIG. 3B represents the arrangement or format of that data;

DESCRIPTION

Figure 1:
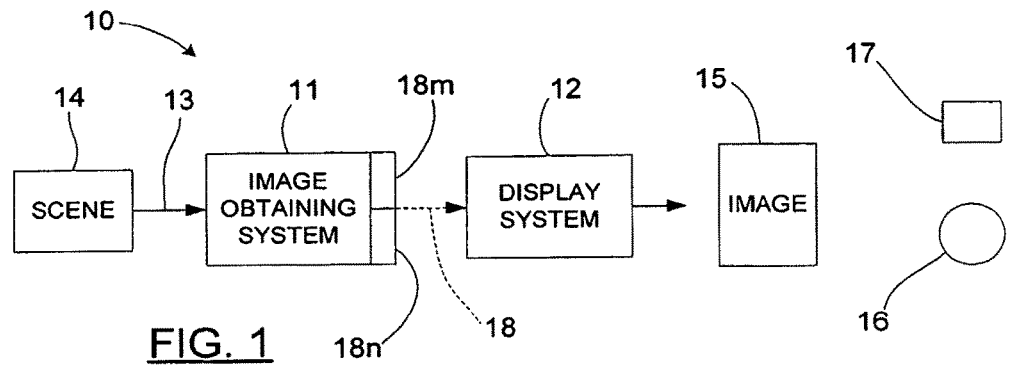
FIG. 1 is a schematic block diagram illustration of an imaging and display apparatus according to an embodiment of the invention.

Referring to the drawings, wherein like reference numerals designate like parts in the several figures, and initially to FIG. 1, an imaging and display apparatus 10 is shown schematically. As is described further below, the imaging and display apparatus 10 is for passive displays and is operative to evaluate the illumination of an input scene and incorporates data representative of such input scene within a transfer media. The data controls the optical characteristics of the illumination source for the passive display and the gamma in order to tend to minimize energy requirements, to tend to maximize contrast or shades of gray in the displayed image, and to tend to optimize light source operation for color fidelity. The data provided the transfer media may be a video signal, modulated video signal, s-video signal, digital signal, or any other signal that can be stored in a medium and/or can be broadcast or otherwise transmitted to a system for displaying images.

The imaging and display apparatus 10 includes an image obtaining system 11 and a display system 12. The imaging and display apparatus 10 uses the image obtaining system 11 to obtain information 13 concerning a scene 14, and the information appropriately is provided to the display system 12, the display system 12 is able to display an image representative of the scene 14. The output from the display system 12 is an image 15 that can be directly viewed by a viewer, e.g., a person, that is schematically represented at 16. Direct viewing may include directly looking at the image 15 or looking at the image via one or more lenses, reflectors, optical filters, etc. The image 15 also may be projected onto a screen or onto some other surface, which is schematically represented at 17, and the images projected to that surface may be viewed by the viewer 16; such projection may be carried out using various lenses, reflectors, etc.

A dashed line 18 represents a relationship between the image obtaining system 11 and the display system 12. That relationship may be a direct electrical connection, an optical signal connection, a broadcasting antenna and receiving antenna system, wireless, wi-fi, a physical medium, such as a video tape, DVD, hard drive (magnetic or otherwise) digital memory, solid state memory, or any other mechanism to provide data that represents characteristics of the input information 13 from the scene 14 to the image obtaining system 11 so that the display system 12 can display images 15 portraying the scene. Collectively the relationship 18 will be referred to below as "medium" that includes all of the foregoing and, thus, may be, for example, an actual broadcast signal, a physical medium on which data is stored, electrical signal, optical signal, etc. or other connection between the image obtaining system 11 and the display system 12, etc.

As is described in further detail below, the image obtaining system 11 provides to the medium 18 data as a representation of the (scene) input information 13, and such data is provided as both image data 18$m$ and illumination data 18$n$. The image data represents the various features or characteristics of a scene 14, objects in the scene, such as an image of a tree standing in a field, etc. and the illumination data represents the illumination of or brightness of the scene 14. As will be described in further detail below, such image data and/or illumination data may be edited, adjusted, altered, etc. The image data 18$m$ and illumination data 18$n$ is provided by the signal processing device 21 to the medium 18 where it is stored and/or broadcast, e.g., as a television signal, digital signal, or the like. The data 24 (FIGS. 2A and 2B) may be used in the display system 12 to provide images 15.

Figure 2A:
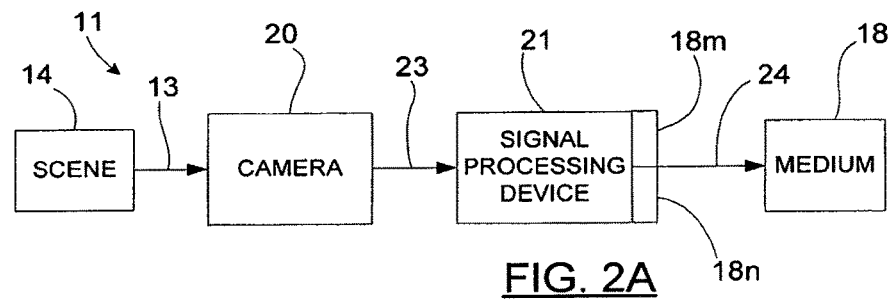
FIGS. 2A and 2B are schematic block diagram illustrations of image obtaining systems of the imaging and display apparatus of FIG. 1.

Turning to FIG. 2A, the image obtaining system 11 is illustrated schematically. The image obtaining system 11 includes a camera 20 and a signal processing device, circuit or system 21 (referred to as "device" below). The camera 20 may be used to obtain information 13 representing the scene 14, as in a conventional video camera, digital camera, etc. The camera may be an electrical/electronic type camera that obtains the scene information 13 as an input and provides as an output 23 electronic signals, e.g., video signals, digital signals, or some other type of signals, representing an image of the scene 14. The camera output 23 is provided as an input to the signal processing device 21. The camera 20 may be a film camera that transfers the scene information 13 to film; the film may be developed and scanned or otherwise converted to electrical, optical or other signals that can be provided in effect as an output 23 and, thus, as an input to the signal processing device 21. The camera 20 may be any other device that obtains input information regarding a scene and provides representative output signals at 23 as an input to signal processing device 21. The signals at 23 provided as input to the signal processing device 21 may be of any of existing formats or formats to be developed in the future, and such signals and formats should be compatible with the capabilities and operation of the signal processing device 21.

A number of approaches may be used to obtain the image data 18$m$ and the illumination data 18$n$, which are collectively represented at 24. As one example, the signals provided by the camera 20 as input 23 to the signal processing device 21 may be electronic representations of an image of a scene 14. Those signals may be provided the signal processing device 21 in a format allowing the signals to be evaluated to obtain brightness or illumination level of the scene 14.

The output data 24 includes both image data 18$m$ and illumination data 18$n$. The image data represents, for example, for a passive liquid crystal display, DMD, etc., an indication of which pixels are "on" (e.g., providing a light output by reflection or transmission) and which pixels are "off" (not providing a light output). An image would be provided by a display based on the on and off pixels and illumination thereof.

The illumination data represents the illumination level or brightness of the scene 14 as input to the image obtaining system 11. The illumination or brightness can be determined from the input data 23 from the camera 20 to the signal processing device 21. For example, if the data representing each respective pixel of information as detected by the camera 20 includes R, G, B values, and intensity value(s), or includes gray scale information, which includes illumination value, that information can be used by the signal processing device 21 to represent brightness or illumination level of the image that would be formed by the pixels of a passive display.

To obtain the illumination information for use in displaying respective images by the display system 12, for example, the signal processing device 21 may use any of a number of techniques. One exemplary technique is to average the illumination data for a given image (or frame), e.g., by summing the illumination level for each pixel of the frame and dividing by the total number of pixels. Another technique is to integrate the illumination values of all the pixels of a given frame. Still another technique is to obtain a weighted average or integration, e.g., as by using a standard deviation technique, an average between a predetermined maximum illumination value and minimum illumination value, other than zero, of selected blocks or areas of the image, or some other approach to obtain the weighted illumination level. The illumination information can be obtained by looking at, integrating over, averaging from all pixel data contained in a particular image or frame representation of the image that is to be displayed; or the illumination information may be obtained from less than the entire image or frame, e.g., from nine (or some other number) different locations in the image or frame; or both.

The signal processing device 21 combines the illumination data and the image data and provides the same as the output data 24 to the medium 18. The illumination data may be multiplexed with the image data.

Figure 2B:
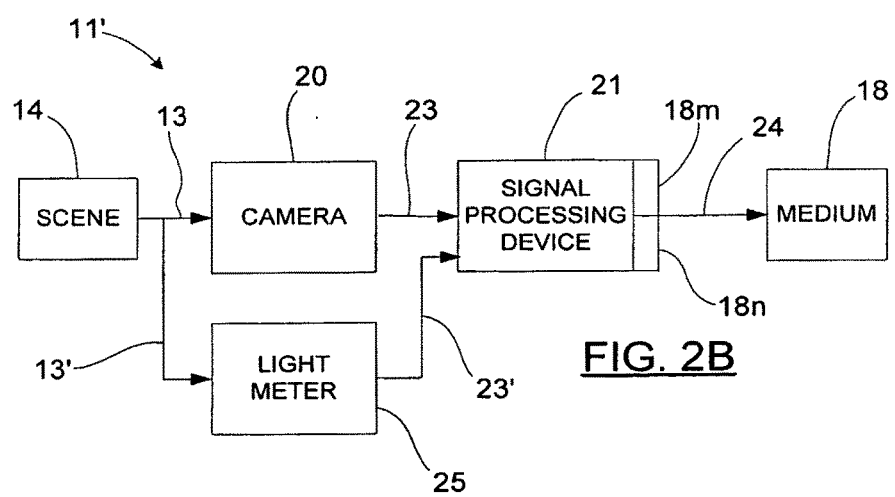

Briefly, turning to FIG. 2B, an image obtaining system 11' (primed reference numerals herein designate parts similar to, but not necessarily identical to parts that are designated by the same unprimed reference numeral in other drawing figures) is shown. A light meter 25 in the image obtaining system 11' measures the illumination of the scene 14, as is represented by the input information line 13' to the light meter 25. The light meter 25 may be any light meter capable of measuring illumination of the scene. The light meter 25 may be able to receive light from the entire scene 14 or only from a portion of the scene 14, e.g., as with a spot light meter or both. For example, as is illustrated in FIG. 2A, the full scene 14 may be viewed and measured by the light meter 25, as is represented by the input line 13'; or the light meter may view and measure light from only a portion, e.g., portion 14a, of the scene 14, as is represented by the dotted line input 13" to the light meter. Other possibilities also may be employed, such as, for example, viewing and measuring several portions (but not all) of the scene, all of the scene and several portions of the scene, all of the scene in respective portions, etc. by the light meter 25. Various algorithms may be designed to average, to integrate, to weight, etc., the results of the light meter measurements to obtain desired characteristics of illumination level data. Similarly, as was described above with respect to FIG. 2A, the illumination data may be provided from portions (not all of a scene), all of the scene and one or more portions of the scene, portions (that sum to all of the scene), etc. and that illumination level data may be weighted, averaged, integrated, summed, etc. as is described herein. The light meter 25 may be adjustable to determine whether the input 13' is illumination from the entire scene 14 or from only a portion of that scene or both. Having such illumination level data available would provide a movie director, film editor, etc., choices in editing to facilitate various emphasis, highlighting, lighting conditions, and other functions that may be desired for accurately portraying a scene, for artistic creation, etc. Examples of editing as a feature of the present invention are described below.

Continuing to refer to FIG. 2B, the light meter 25 provides illumination data as an input 23' to the signal processing device 21. The input 23' represents an electrical representation or some other signal representation of the illumination level measured by the light meter 25. The signal processing device 21 may multiplex the illumination level data with image data and may provide the same to the medium 18, as was described above with respect to FIG. 2A. Therefore, the image obtaining system 11' would not necessarily require the signal processing device 21 to obtain illumination values from image data received from the camera 20, as illumination values are provided from the light meter 25. However, if desired, the signal processing device 21 may carry out functions to obtain illumination values from the data representing the pixels from the camera 20 and may effect adjustment of illumination values, comparison of illumination values, etc., based on data from the camera 20 provided on the input 23 to the signal processing device 21 and data provided from the light meter 25 via the input 23' to the signal processing device 21. Different light meters 25 may have different light measuring and/or output characteristics that may affect gamma or other parameters; to facilitate compensating for such variations, details of the light meter 25 may be provided, e.g., for recording or for inclusion in a broadcast signal, or may be used in the signal processing device 21 where that information would be available to provide suitable compensation in the light source intensity or other parameters associated with a passive display.

The medium 18 may be a signal storage medium capable of storing image data and illumination data 18n in a desired format, e.g., existing formats or a format that may be developed in the future. In one embodiment the illumination data is multiplexed with the image data or both data may be provided in an appropriate way so that in a display system 12 the image data and illumination data can be discerned and used to provide images 15. The medium 18 may be an optical storage medium, magnetic storage medium, DVD, CD, hard drive, electronic memory, tape, or virtually any device capable of storing the image data and illumination data. As one example, if the medium 18 were a DVD, then the DVD would be able to be provided to a display system 12 that would be able to display images represented by the data stored in the DVD. The medium 18 may represent broadcasting, for example, the medium 18 may be a broadcast signal that is not necessarily stored in a memory but rather is broadcast from a transmitter to a receiver. The broadcaster may be a television antenna and associated electronics, an electrical, optical or other cable capable of carrying the image data and illumination data to a display system 12 for displaying images or for storage at the display system, e.g., in a VCR, DVD, hard drive, such as a Tivo system or some other device for subsequent display, satellite broadcasting system, etc. Thus, the term "medium" includes both the possibility of being a storage device that may be conveyed from one location to another or may be connected to receive, to store, and to provide for displaying the image data and illumination data. Also, the medium 18 may represent a transmission medium or capability to transmit the image data and illumination data from the image obtaining system 11 to a display system 12.

The medium 18 may include a data storage system, such as, for example, a CD writing or burning system, DVD writing system, a magnetic data writing system, e.g., a hard drive, magnetic tape and/or tape drive, etc. The signal processing device 21 may provide for storage in the medium 18 or for broadcasting the image data in combination with the illumination data, the illumination data being multiplexed with the image data or otherwise combined with the image data. Alternatively, if desired, the medium 18 may be provided with both the image data and illumination data, on the one hand, and the image data without a separate storage of illumination data, e.g., conventional image data with R, G, B, illumination, and possibly other information provided per pixel, on the other hand; and this would allow reading from the medium respective data to display images using a conventional display system having a passive display without an adjustable light source or using a display system with a passive display and an adjustable light source.

Figure 3A:
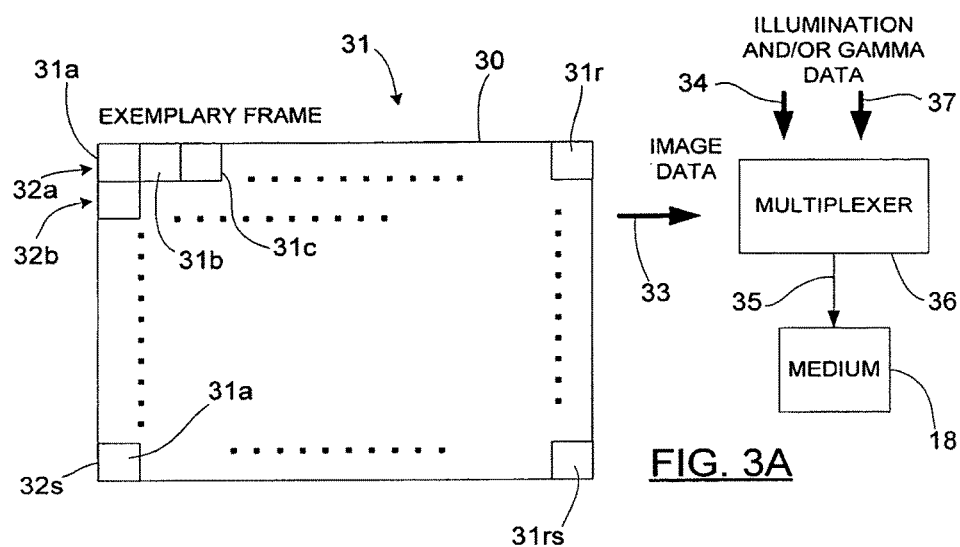

Referring to FIG. 3A, an exemplary frame 30 is illustrated. The frame 30 shows a layout or an organization of the R, G, B data representing respective pixels of input information 13 of a scene 14 as obtained by the camera 20. Exemplary pixels 31a, 31b, . . . , 31r in respective rows 32a, 32b, . . . , 32s are illustrated. The last pixel of image data in the last row of frame 30 is indicated as pixel 32rs. Each of the respective pixels 31 contains suitable image information, such as, for example, R, G, B values, intensity saturation, hue and possibly other information. The camera 20 itself or with additional circuitry may provide such information for the pixels of the exemplary frame 30 in a format able to be used by the signal processing device 21. That format may be conventional of the type typically produced by a video camera, digital video camera, digital camera, or some other camera. That format may be a format provided by a scanner, which has scanned images from a film, photograph, or other source of single or sequence of images. The format would be of a type able to be provided for display by a television, monitor or other display device without or possibly with additional signal processing prior to being displayed. Alternatively, the camera 20 may provide the information representing the pixels 31 in some other format. The format should allow the signals to be used by the signal processing device 21.

The image data 33 representing the information associated with the respective pixels 31 of the exemplary frame 30 is provided to the signal processing device 21. In the signal processing device 21 illumination data, which is represented by arrow 34, may be obtained in the manner described above, for example, by averaging, integration, or by some other technique. Alternatively, illumination information may be provided the signal processing device 21 by a light meter 25. In the signal processing device 21 the image data 33 and the illumination data 34 is combined and then is provided as combined data 35 to the medium 18. In the embodiment as illustrated in FIG. 3A, combining of the image data 33 and illumination 34 is achieved using a multiplexer 36 to multiplex the illumination data 34 with the image data 33. The multiplexer may be a conventional multiplexer, may be electronic circuitry operated by a suitable software program to effect multiplexing of the data, etc. Thus, an exemplary frame 30 (image data) may be provided to the medium 18 in combination with illumination data representing the illumination level of an illumination source for a passive display that displays in a display system 12 an image represented by the exemplary frame.

Alternatively, or in addition to providing illumination data 34 to be combined with image data 33 for a respective frame 30, gamma data 37 also may be provided, and in such case the gamma data 37 is combined, e.g., by multiplexing or some other mechanism, with the image data 33 to provide combined data 35 to be provided the medium 18. The gamma data, which may be gamma correction data or information 37, therefore, may be provided with respect to each frame 30 or with respect to a number of frames 30. Therefore, since gamma can be adjusted or corrected on a frame by frame basis or on a group of frames by a group of frames basis, or in any event, if desired, more frequently than in conventional display systems, the accuracy of the portrayal of a scene 14 by an image 15 provided by a display system 12 may be enhanced or increased relative to prior imaging apparatus and display systems.

Gamma information can be personal to the light source that illuminates a scene when the image of the scene is recorded; and/or gamma information can be personal to the recording device, e.g., camera 20. This gamma information can be recorded in the medium 18 and used to adjust the light source of a passive display and/or other characteristics or parameters of a passive display to try to obtain to portray the input scene 14 as accurately as possible by the display.

Figure 3B:
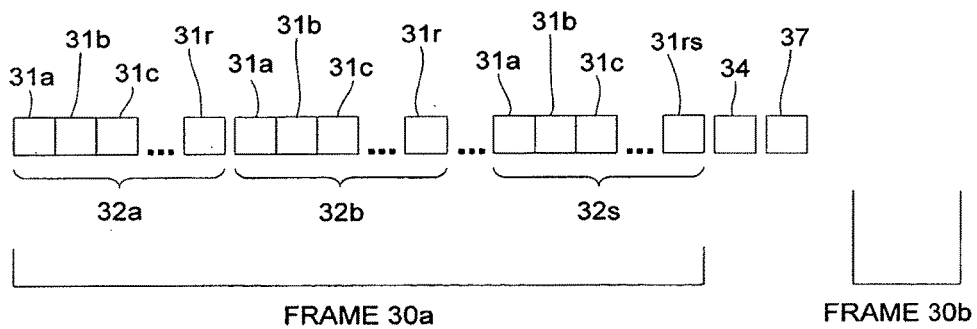

An example of an embodiment for multiplexing illumination data 34 and gamma data 37 with image data 33 is illustrated schematically in FIG. 3B. The pixel data for each of pixels 31a, 31b, . . . , 31r for each row 32a, . . . , 32s of a frame 30a is presented sequentially and may be stored in medium 18, broadcast via medium 18, etc. Sequentially following the pixel data are two additional data objects or storage locations 34 and 37, which contain the illumination level data and the gamma data for the frame 30a. Frame 30b follows frame 30a and likewise contains pixel data followed by illumination data and gamma data for frame 30b. Subsequent frames similarly may have illumination data and gamma data multiplexed with the pixel data. Another example of storing the illumination level data and/or gamma data is to store it in the interstices of the image data, e.g., at respective locations between or within respective pixel data. It will be appreciated that other techniques may be used to combine image data with illumination data and/or gamma data.

Using the invention, then, it will be appreciated that illumination data and/or gamma data or gamma correction data can be included in the medium 18 without substantially increasing the amount of data representing the images in the medium. Therefore, such addition of data does not significantly increase the bandwidth required for transferring video or other signals from the image obtaining system 11 to the display system 12, whether broadcast or provided via cable, via DVD, or via some other means. However, by providing such illumination data and gamma data or gamma correction data, to provide adjustment of images as they are displayed by a passive display tends to obtain good color fidelity, contrast, accuracy of image reproduction, etc.

Figure 4:
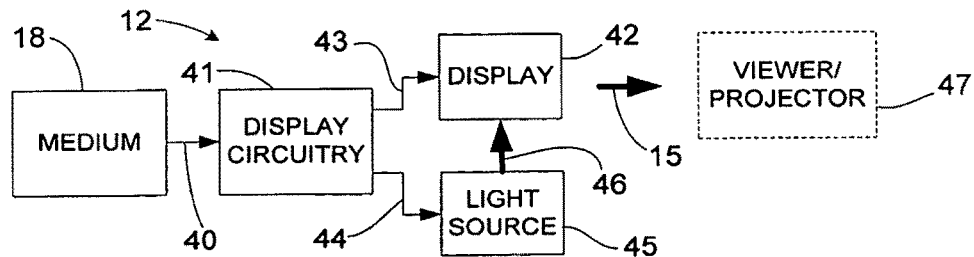
FIGS. 4-7 are schematic block diagram illustrations of embodiments of display systems.

FIG. 4 shows additional details of the display system 12. The medium 18 provides the image data 33 and the illumination data 34 and/or gamma correction data 37, as is shown by the input 40, to display circuitry 41 of the display system 12. The display circuitry 41 responds in the usual fashion to the image data to operate a passive display 42, such as a liquid crystal display, by providing the image data via a connection 43. The display circuitry 41 also responds to the illumination data 34 and/or the gamma correction data 37 and provides via a connection 44 to a light source 45 (illumination source or illuminating source) to determine the illumination output from the light source. The illumination provided by the light source is directed, as is represented by the arrow 46 as incident light to the display 42. The display 42 provides an image 15 for viewing by a viewer or projection by a projector, as is represented at 47. The details of the image 15, e.g., which pixels are on and which are off, are controlled according to the image data input 43 to the display 42 and the illumination level of the light source 45 is adjusted or controlled in response to illumination and/or gamma data 44.

The display circuitry 41 may include appropriate circuitry and computer program software to distinguish between the image data signals and the illumination and/or gamma data from the medium 18. The display circuitry 41 may directly operate the display 42 or there may be other amplifiers or other display driving circuitry provided between the display circuitry 41 and the display 42, depending, for example, on the character of the display 42. The signal at input 44 to the light source 45 may be a control signal that controls the intensity, color, color temperature or other characteristic or parameter of the light produced by the light source 45, which would have a separate power input; the signal on line 44 may be the actual power signal that operates the light source to provide light output at an intensity level that is a function of the power signal, color, color temperature or other characteristic or parameter.

In operation the display system 12 responds to signals 40 from the medium 18 to provide images 15 that have an illumination level or brightness according to the intensity of light from the light source 45. For a bright image the display 42 would provide the various details of the image by the respective on and off pixels, and the light source 45 would provide a relatively high intensity illumination level to the display. For a relatively dark image, the pixels of the display 42 also may be operated to provide accurate representation of the features of the image, and the light source 45 would provide a relatively lower level of illumination to the display 42, thus providing a dimmer or darker image 15. The determination of brightness of the light source 45 would be made at the image obtaining system 11 so that the display system 12 may be able to provide promptly the desired image without itself having to make computations to determine the illumination level of the light source 45.

Since the light source 45 does not have to be operated at full intensity all the time, but rather is operated at reduced intensity for the display 42 to display relatively dark scenes, for example, energy is conserved. This power saving feature may increase the effective operational life of batteries in a portable computer device or other portable display device.

As for gamma correction, various algorithms are known for correcting gamma. In the past usually a fixed gamma correction was made for a given display, and the gamma correction would remain in effect whenever the display would be used. Ordinarily adjustment of gamma correction would not have been possible after it had been set; and even if it were possible to make adjustments to gamma, usually the gamma correction would have been set to a given value and would not be continuously changed or able to be continuously changed. In an active display, such as a CRT, a fixed gamma correction is possible because although intensity of output light may change, ordinarily the color of that output light would not change. However, in a passive display in which the intensity of the illuminating light may change, color effect also may change, e.g., due to changes in color temperature of the light produced by the light source. Also, as a given light source for a passive display ages, color temperature also may change and, thus, affect gamma and, therefore, require gamma correction.

In the present invention since the light source intensity can be adjusted and is intended to be adjusted during operation of the display system 12, that adjustment of light intensity also can take into account gamma correction. Such gamma correction may be according to conventional or new gamma correction algorithms.

Figure 5:
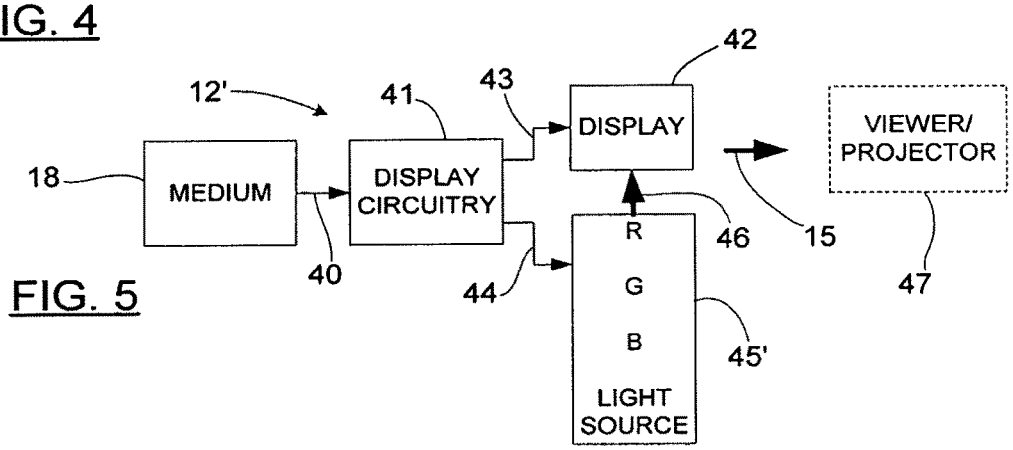

Turning briefly to FIG. 5, a portion of a display system 12' is illustrated, including a light source 45' and display 42 that cooperate to provide an image 15. The light source 45' includes three separate light sources, red, green, and blue light sources, respectively, designated by the letters R, G, and B. The display system 12 of FIG. 5 may operate on a field sequential basis or frame sequential basis. Accordingly, the display circuitry 41 operates the display 42 and the light source 45' so as to provide three sequential images to compose the image 15, namely, a red image, a green image, and a blue image. When the red light source R of the light source 45' is providing output light, the other green and blue light sources are off, and the display 42 is operated by the display circuitry 41 to provide the red portion of the image 15; and similarly, the green and blue portions sequentially are provided using the green and blue light sources G and B. Such operation allows for adjustment of the intensity of the light provided by the three light sources are R, G and B of the light source 45', thereby not only to control intensity or brightness of the image 15 but also the color and for each light source a gamma correction or adjustment effect. Thus, the ability for the image 15 accurately to portray the scene 14 may be enhanced compared to conventional display systems.

Figure 6:
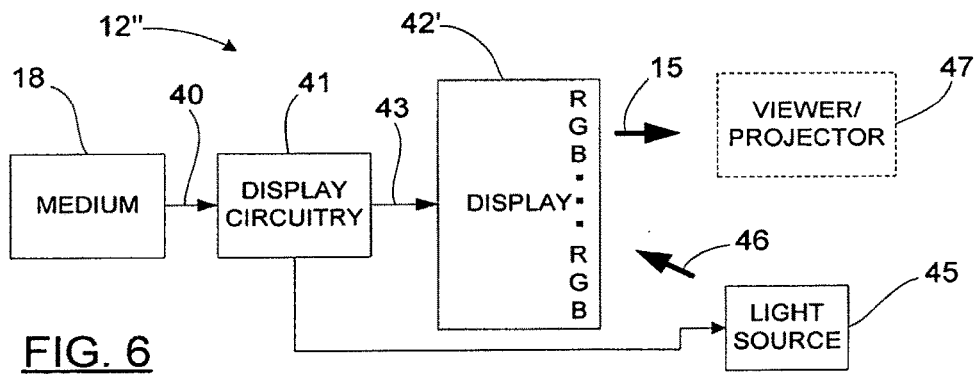

Color images may be provided using the features of the present invention in combination with various other types of color display systems that use passive displays. For example, a single display having red, green and blue pixels formed by respective red, green and blue filters associated with the pixels may be used with a single light source 45. An example is illustrated in the display system 12" in FIG. 6. The medium 18 provides the display circuitry 41 with input data, as was described above. The display circuitry 41 operates a reflective display 42' to turn on or off respective reflective pixels collectively shown at 50 with respective red, green and blue (R, G, B) filters. The light 46, e.g., white light or light having selected desired wavelengths, from the light source 45 illuminates the display, and image 15 is formed by reflection. Similarly, the image could be formed by transmission through the display 42' if a transmissive display were used.

Figure 7:
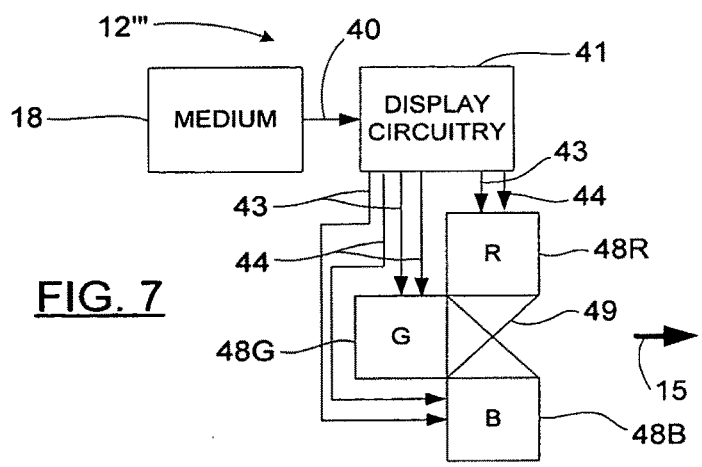

In FIG. 7 is illustrated schematically another display system 12''' that has respective red, green and blue light/image engine portions 48R, 48G, 48B Each light/image engine portion produces the respective red, green or blue color portions of the image 15 using a light source and passive display, as well as a filter or coloration of the light source to obtain a respective color for each of the respective portions 48R, 48G, 48B. The display circuitry 41 provides image data and illumination data representative of each color portion of the image 15 to respective light/image engine portions as shown at 43, 44. A beam splitter arrangement 49 may be used to combine the image portions to provide the image 15.

The above embodiments of display systems 12 are exemplary, and it will be appreciated that other types of display systems may be used in accordance with the various features of the invention as disclosed herein.

Figure 8:
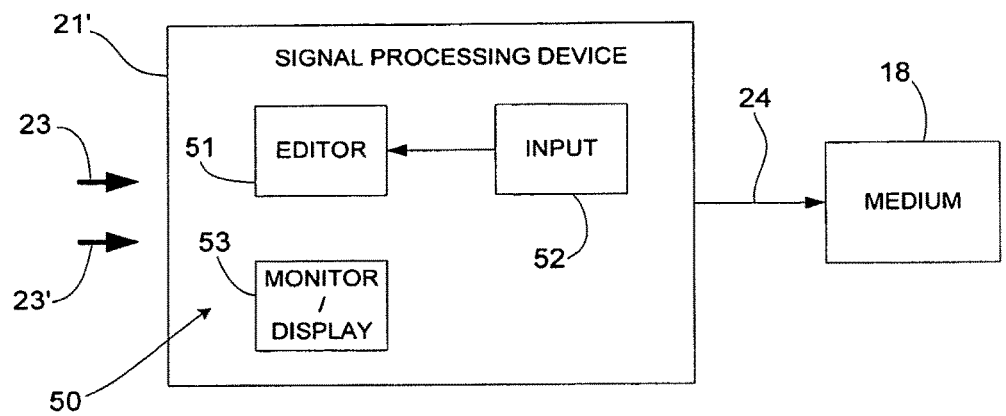
FIG. 8 is a schematic block diagram of a signal processing device with an editor feature.

In FIG. 8 an editor feature 50 is shown in association with the signal processing device 21'. The signal processing device 21', as in the case of the embodiments illustrated and described above, receives an input 23 and possibly also 23' (FIGS. 2A and 2B) as an electronic representation of image information 13 of a scene 14. The editing feature 50 includes an editor 51 an input device 52 for operating the editor 51 and a monitor or display 53. Using the editor feature the image data and/or illumination data 33, 34 (FIG. 3) and, if desired, gamma characteristics 37 (FIG. 3) can be edited to change the values thereof. In using the editor feature 50, a person may observe an image represented by the current values of the image data, illumination data, and gamma data by viewing the monitor/display 53, as is represented in the flow chart or method 60 in FIG. 9, and using the input 52 the person may make adjustments to the data to alter the image as desired. Thus, the producer or editor of a movie or of some other group of images may make decisions and adjust light intensity and/or gamma and may provide the resulting adjusted/edited movie, images, etc. in or to the medium 18 for storage, broadcasting, etc. Color effects also can be adjusted/edited, e.g., to create a scene that appears to be at sunset, taken in a candle lit room or cave, under water, etc., by adjusting illumination intensity of the back light in general or of respective color components (R, G, B, for example) of the image; and the resulting edited data can be provided the medium 18.

Figure 9:
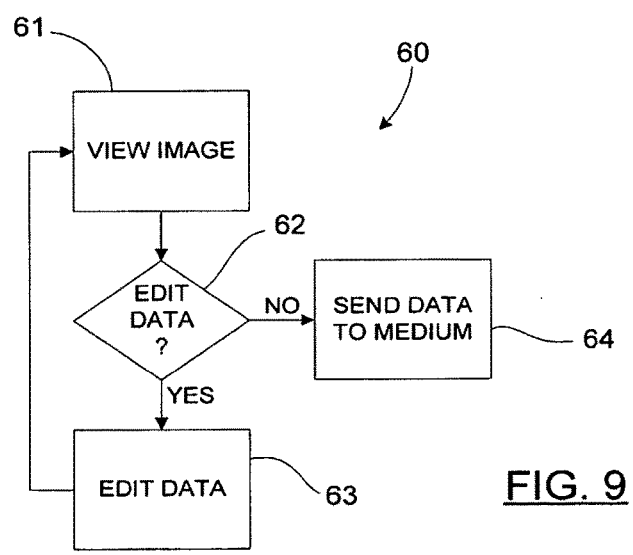
FIG. 9 is a flow chart of an exemplary method for editing data.

As is shown in FIG. 9, a person may view an image at block 61 and make mental decisions or have the editor 51 make the decisions based on conventional image adjusting algorithms, e.g., to adjust brightness, contrast, and/or gamma, or algorithms that may developed in the future as to the quality of the image, characteristics of the image, etc. At block 62 an inquiry is made whether to edit data of such viewed image. If editing is desired, then the data is edited at block 63, and then the image is viewed again (or is constantly viewed as the data is edited). If no editing is desired or required or if editing has been completed, then from block 62 the flow chart/method goes to block 64 to send the data to the medium 18 for broadcasting, storage, etc. Such editing can be carried out for each image, such as for each image frame 30 (FIG. 3) or for each other assemblage of image data representing an image. Such editing may be carried out for a group of images or frames. For example, if several frames have similar data, then the editing of one of those frames may be used to adjust the data for the other related or similar frames.

The editor feature 50 may be constantly available and set to a mode that each frame or each group of frames is to be reviewed via the monitor/display 53, for example, for editing. The editor feature 50 may be selectively set (a) to a bypassed condition in the signal processing device 21' so that no editing would be applied to the data that is otherwise automatically processed in the signal processing device 21' in the manner described above; or (b) to an activated condition to carry out editing. For example, in the case of a high quality movie, the editor feature 50 would be activated so that editing is applied. Alternatively, for a relatively low-cost movie it may be desired to deactive the editor feature 50 to save time and cost of production.

The editor feature 50 is shown in FIG. 8 as part of the signal processing device 21'. The other portions of the signal processing device 21' are not illustrated but may be circuitry, devices, and operation, e.g., by software, as was described above. However, it will be appreciate that the editor feature 50 may be separate from the signal processing device. An exemplary device for use as the editor feature 50 may be a computer system including a monitor/display 53, input/output devices, such as a keyboard, mouse, joy stick, pointer, etc., and appropriate memory and storage devices. Such a computer system may be connected to the signal processing device to receive data from it for display on the monitor/display 53 and for editing the data for return to the signal processing device and ultimately to be provided to the medium 18. Such a computer system also may be included as part of the signal processing device 21' as is illustrated at 50 in FIG. 8. Such computer system may use a suitable computer program to carry out the editing functions; an example of a suitable computer program is that sold under the trademark Adobe Photoshop, version 7.0. However, it will be appreciated that other existing computer program software may be used for editing.

A number of different techniques may be used for determining the illumination level for the light source 45, 45' (FIGS. 4, 5) as represented by illumination data. Several examples are described above, including obtaining an average, a weighted average, integration, or weighted integration of the brightness information obtained by the camera 20 or brightness information obtained by a light meter 25 (FIGS. 2A, 2B). Such brightness information may be obtained by a single frame or image or from a portion, from portions and/or from all of a frame or image, and used to determine the illumination level of the light source when the image represented by that frame is provided by the display 42.

Another method for determining the illumination level is to use the illumination level information from a number of frames to determine the illumination level for a given frame. This method may use illumination level from several frames that have been displayed prior to the given frame being displayed, from several frames that will be displayed following the displaying of the given frame, or from several frames preceding and following the given frame.

In the editing process various adjustments could be made to enhance certain characteristics of the displayed image; and the algorithms for adjusting the light source 45, 45' also may be set to accomplish such enhancement. In an exemplary embodiment assume a dark scene at night along with a bright street light in the image or a momentary lightning flash. By setting the integration function to a desired weight to determine the illumination of a frame representing such a scene or by carrying out appropriate editing steps, the bright portion of the image could be highlighted or diffused. For example, the intensity of the lightning flash may increase the integrated brightness of the image substantially, which would reduce the difference in intensity between, say, a bolt of lightning, and the balance of the image; in contrast, by diminishing the impact of the lightning flash, e.g., by maintaining the intensity of the balance of the image at a relatively dark scene level, the lightning bolt would tend to stand out or to be highlighted.

Figure 10:
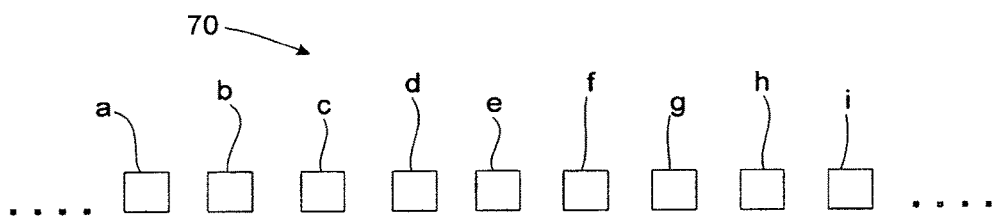
FIG. 10 is an illustration of respective sequential pixels for use in describing embodiments for determining the illumination level of an incident light source for a passive display.

In FIG. 10 a sequence of frames 70 is illustrated schematically. The sequence of frames includes, among others, frames a-i. For this embodiment it is assumed that the brightness or illumination level of the light source for displaying frame e is to be determined, and it also is assumed that frames a-d would be displayed sequentially prior to the displaying of the image represented by the data of frame e and that the images represented by the data of frames f-i would be displayed subsequent to the displaying of the image represented by frame e.

If the illumination level of the given frame e is to be determined based on the illumination level of preceding frames, a number of those preceding frames would be selected, e.g., three frames, meaning in this example frames b, c, and d (or one or more other number of frames). The illumination level of those three frames may be determined and used to determine the illumination level of frame e. In another example, the illumination level of the three preceding frames (or any number preceding frames as are selected or preselected or set in the signal processing device 21, 21' is combined with the illumination level of frame e. Combining of illumination levels may be, for example, obtaining an average of the illumination levels of the respect frames; those illumination levels included in the average may be obtained by averaging, weighted averaging, integration, weighted integration, or some other method, as may be desired. A similar approach may be used to obtain an illumination level for the given frame e using the illumination levels of one or more subsequent frames alone or in combination with the illumination level of the given frame e. Furthermore, if desired, the illumination level for the given frame e may be obtained using the illumination level information from one or more preceding frames and one or more subsequent frames.

A number of advantages may be achieved using the method described above with respective FIG. 10 to obtain an illumination level for respective given frames using illumination level of one or more other frames. For example, in the event there were an aberration in the illumination of a given frame due to a data error, due to an unintended instantaneous and brief change in illumination of the scene, e.g., such as may be encountered in an indoor movie sound stage or setting having a given light level when a door to the bright ambient sunlit outside is opened, a light switch mistakenly is turned on during filming, etc.; the effect of such brief change in illumination is in a sense averaged out so that it has relatively little impact and does not require the refilming of a given scene. Another advantage is the reducing of the amount of editing required for a series of frames and/or the averaging out an error that may occur when editing a single frame (or several frames) or the mistaken or intentional omitting of editing of a signal frame (or of several frames). Another advantage would be the ability to provide for relatively smooth transitions in illumination level even as scenes change for a given movie, e.g., from a relatively dark scene to a relatively bright scene. Sharp changes in illumination level may be eye catching, on the one hand, but such eye catching effect may be disadvantageous when one person is watching a movie while another person is trying to sleep—the sharp change in illumination may awaken the sleeper. The softer effect or somewhat gradual change in illumination level also may make the viewing of a movie more comfortable, e.g., less harsh on the eyes.

The above-described techniques for editing illumination level using one or more frames different from or in addition to the given frame also may be used to provide gamma adjustment for the given frame. Also, the number of frames and whether the given frame is included in the determining of a illumination level or gamma characteristics may be selected by an editor using the editor feature 50 (FIG. 8).

Figure 11:
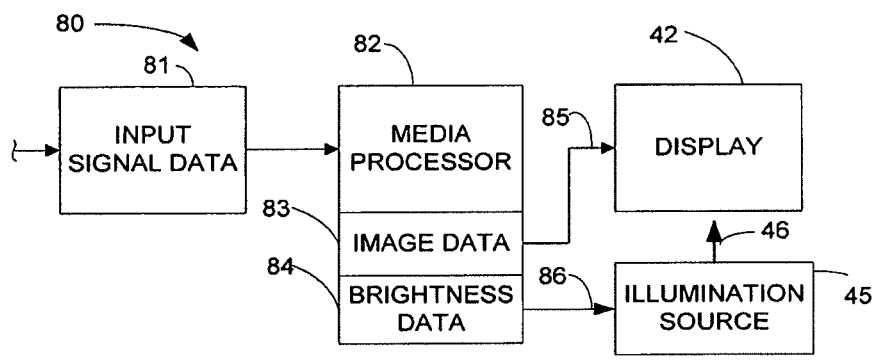
FIG. 11 is a schematic block diagram of a display system embodying some features of the present invention.

Briefly referring to FIG. 11, a display system 80 receives input signal data, e.g., a video signal or some other signal representing an image, brightness information, gamma information and/or gamma correction information, etc., for example as is described herein, at an input 81. The input 81 may receive the signals from an antenna, an electrical or optical cable, a satellite, a CD or DVD player, a tape player, etc. The input signal data is provided a media processor 82, such as a media processor integrated circuit. Included in the media processor integrated circuit is associated hardware, firmware and/or software to obtain and/or to respond to image data 83 and brightness data 84, and, accordingly, the media processor integrated circuit 82 may provide image data via a connection 85 to the display 42 to create respective images and brightness data via a connection 86 to a light source 45 to illuminate the display at respective brightness levels.

If desired, the media processor integrated circuit 82 may receive input signal data as conventional video signals or other similar signals and may include a signal processing device 21, e.g., as was described above, to provide image data and brightness data to the display 42 and light source 45, respectively in a manner similar to what is described above or in other equivalent manner.

INDUSTRIAL APPLICATION

The present invention may be used to obtain, to store and to display images.

I claim:

1. A non-transitory storage medium for storing images for display on a light modulating display and a light source separate from the light modulating display, the light modulating display having a light modulator for each of a plurality of pixels, the non-transitory storage medium comprising:
a material able to retain data representative of images;
image data stored in the material, said image data representative of respective images including a plurality of pixels, the image data including a light modulator setting for respective pixels of the respective images,
illumination data stored in the material, the illumination data being representative of respective images, the illumination data including light source intensity information for application to the light source; and
wherein storage locations at which the illumination data is stored is different from storage locations at which the image data is stored and wherein the image data and the illumination data are separately encoded.

2. The non-transitory storage medium of claim 1, the image data representing light transmission of respective pixels of the image provided by the effect of the light modulating display modulating light incident to the light modulating display according to the light modulator setting, and said illumination data being stored in the material at a place that does not represent light transmission of a respective pixel.

3. The non-transitory storage medium of claim 1, the illumination data being multiplexed with respect to the image data.

4. A method of data storage for a sequence of images, the method comprising:
encoding image data representative of a sequence of images;
storing in a non-transitory storage medium the encoded image data representative of a sequence of images including a plurality of pixels, the encoded image data including a passive display light modulator setting for respective pixels of respective images of the sequence of images,
encoding brightness control data representative of respective images, wherein said encoding the brightness control data is separate from the encoding of the image data representative of a sequence of images, wherein the brightness control data includes light source intensity information for the respective images and includes adjusted light characteristics for application to a light source separate from a passive display; and
storing at a different location in the non-transitory storage medium the encoded brightness control data.

5. The method of claim 4, the storing the encoded brightness control data comprising storing brightness data representative of a number of images.

6. The method of claim 5, the storing the encoded brightness control data comprising storing for one image brightness information representative of a number of images.

7. The method of claim 4, the storing steps comprising storing data in a DVD, C, tape or memory device.

8. The method of claim 4, the storing the encoded brightness control data comprising storing brightness information including gamma correction.

9. The method of claim 4, the storing the encoded brightness control data comprising storing brightness information representative of brightness of one image based on brightness of a number of images.

10. A method of storing image data, comprising:
encoding image information representing respective images, the encoded image information representative of respective images including a plurality of pixels, the encoded image information including a passive display light modulator setting for respective pixels of respective images;
storing in a non-transitory storage medium the image information representing respective images;
encoding image brightness control information, wherein said encoding the brightness control information is separate from the encoding of the image information and wherein the brightness control information includes light source intensity information for the respective images and includes adjusted light characteristic for application to a light source separate from a passive display; and storing the encoded image brightness control information in the non-transitory storage medium at a separate location from the location at which image information is stored.

11. The method of claim 10, the storing the encoded image brightness control information comprising multiplexing the image brightness information with the image information, said multiplexing comprising storing for at least one image, image brightness representative of image brightness of a number of images.

12. The method of claim 10, the storing the encoded image brightness control information comprising storing for at least one image, image brightness representative of image brightness of a number of images.

13. A transfer medium for use with a passive display operable to be illuminated by light from a light source to provide images, comprising:

a non-transitory transfer medium providing separately encoded image data representing respective images of a input scene and separately encoded gamma data representative of an evaluation of the illumination and/or colors of an input scene to control optical characteristics of such a light source.

14. A non-transitory storage medium, comprising:

a material able to retain data representative of images, separately encoded image data stored in the material, said separately encoded image data representative of respective images, the encoded image data including a passive display light modulator setting for respective pixels of respective images, and separately encoded brightness control data stored in the material, said brightness control data representative of brightness of respective images and includes adjusted light characteristic and light source intensity information.

15. A non-transitory storage medium, comprising:

a material able to retain data representative of images;

separately encoded image data stored in the material, the image data representative of respective images, the encoded image data including a passive display light modulator setting for respective pixels of respective images; and separately encoded display control data stored in the material, the display control data comprising illumination control data for use in controlling optical characteristics of incident light to a display and image control data for controlling processing of the image data in the display to control characteristics of displayed images wherein the illumination control data includes adjusted light characteristic for controlling a backlight of a passive display.

* * * * *